United States Patent [19]

Boulanger

[11] Patent Number: 4,745,743
[45] Date of Patent: May 24, 1988

[54] HYDRAULIC FLUID SUPPLY ASSEMBLY
[75] Inventor: Francois Boulanger, Creil, France
[73] Assignee: Massey-Ferguson Services N.V, Curacao, Netherlands Antilles
[21] Appl. No.: 888,652
[22] PCT Filed: Sep. 24, 1985
[86] PCT No.: PCT/EP85/00495
  § 371 Date: May 22, 1986
  § 102(e) Date: May 22, 1986
[87] PCT Pub. No.: WO86/02413
  PCT Pub. Date: Apr. 24, 1986
[30] Foreign Application Priority Data
  Oct. 10, 1984 [GB] United Kingdom ............. 8425655
[51] Int. Cl.$^4$ ............................................. F16D 31/00
[52] U.S. Cl. .................................. 60/325; 60/454; 417/360
[58] Field of Search .................. 417/360, 63; 60/484, 60/486, 325, 453, 454, 328; 91/462

[56] References Cited
U.S. PATENT DOCUMENTS 2,799,139  7/1957  Becker .
4,043,127  8/1977  Kubik .
4,255,091  3/1981  Dike, Jr. ............................ 417/63
4,290,446  9/1981  Seiler .............................. 417/63
4,348,864  9/1982  Ichimura et al. ................. 60/454

FOREIGN PATENT DOCUMENTS 540152   10/1941  United Kingdom .
648913   1/1951   United Kingdom .
684429   12/1952  United Kingdom .
712338   7/1954   United Kingdom .
783333   9/1957   United Kingdom .
1538147  1/1979   United Kingdom .

Primary Examiner—Edward K. Look

[57] ABSTRACT

A hydraulic fluid supply assembly for an agricultural or industrial tractor or similar vehicle. The assembly includes a mounting plate which closes an aperture in a back axle casing of the vehicle and which carries a hydraulic pump, a pump feed means, and a filter which is mounted on a filter head formed integrally in the plate. The supply assembly is arranged to be demountable from the casing as a unit. The mounting plate also carries one or more hydraulic valves or other hydraulic consumers which receive fluid from the pump via supply passages formed integrally in the mounting plate and a gear wheel which engages with the vehicle drive train to provide drive to the pump when the mounting plate is secured in position over the aperture.

7 Claims, 8 Drawing Sheets

HYDRAULIC FLUID SUPPLY ASSEMBLY

TECHNICAL FIELD

This invention relates to assemblies for supplying a source of pressurised hydraulic fluid to operate a wide range of functions on an agricultural or industrial tractor or similar vehicle.

Conventionally such supply assemblies comprise a number of components, including a pump and a fluid filter, which are separately supported on the vehicle and are connected to each other by hydraulic piping.

Such arrangements suffer from a number of disadvantages such as being costly in terms of installation time, being particularly vulnerable to leakage and failure due to the use of long lengths of piping, and being difficult to service since any components of the assembly which are housed internally within the vehicle are not readily accessible. This latter difficulty often, in the case of tractors, necessitating actual disassembly of the tractor chassis to give access to the internally housed components.

DISCLOSURE OF THE INVENTION

It is an object of the present invention to provide an improved form of hydraulic fluid supply assembly which mitigates at least some of the above described difficulties.

Thus according to the present invention there is provided a hydraulic fluid supply assembly for an agricultural or industrial tractor or similar vehicle, the assembly comprising:
  a mounting plate for closing an aperture in a casing of the vehicle which acts as a reservoir for hydraulic fluid,
  a hydraulic pump carried by the plate,
  a pump feed means carried by the plate and connected with the pump, and
  filter means carried by the plate and hydraulically connected with the pump and the pump feed means,
  the assembly being arranged to be demountable from the casing as a unit.

Conveniently, when the invention is applied to an agricultural or industrial tractor, the hydraulic fluid supply assembly closes an aperture in a transmission casing or back axle casing of the tractor and the pump takes its supply of fluid from the fluid within the transmission or back axle.

In a preferred arrangement the mounting plate carries one or more hydraulic valves or other hydraulic consumers which are to receive fluid flow from the pump, the valves or other consumers may have supply passages formed integrally in the mounting plate.

The mounting plate may carry more than one pump, the pumps using the same pump feed means and filter means and supplying different consumers.

The mounting plate preferably also carries a gear wheel or other pump drive means which engages with the vehicle drive train to provide drive to the pump or pumps when the mounting plate is secured in position over the casing aperture.

The mounting plate may include a hydraulic connection for the return of fluid from one or more consumers to the pump or pumps without passage through the pump feed means and filter means.

The mounting plate may include one or more hydraulic test points which communicate with internal passages within the plate so that the hydraulic pressure at various locations in hydraulic circuits associated with the assembly can be checked.

Preferably the filter means comprises a filter which is mounted on a filter head formed integrally in the mounting plate.

The invention also provides a hydraulic filter installation for an agricultural or industrial tractor in which the filter is directly attached to a filter head formed integrally in a transmission or back axle casing of the tractor which casing acts as a reservoir for hydraulic fluid.

DESCRIPTION OF THE DRAWINGS

One embodiment of the present invention as applied to an agricultural tractor fluid supply system will now be described, by way of example only, with reference to the accompanying drawings in which.

BEST MODE OF CARRYING OUT THE INVENTION

Figure 1:
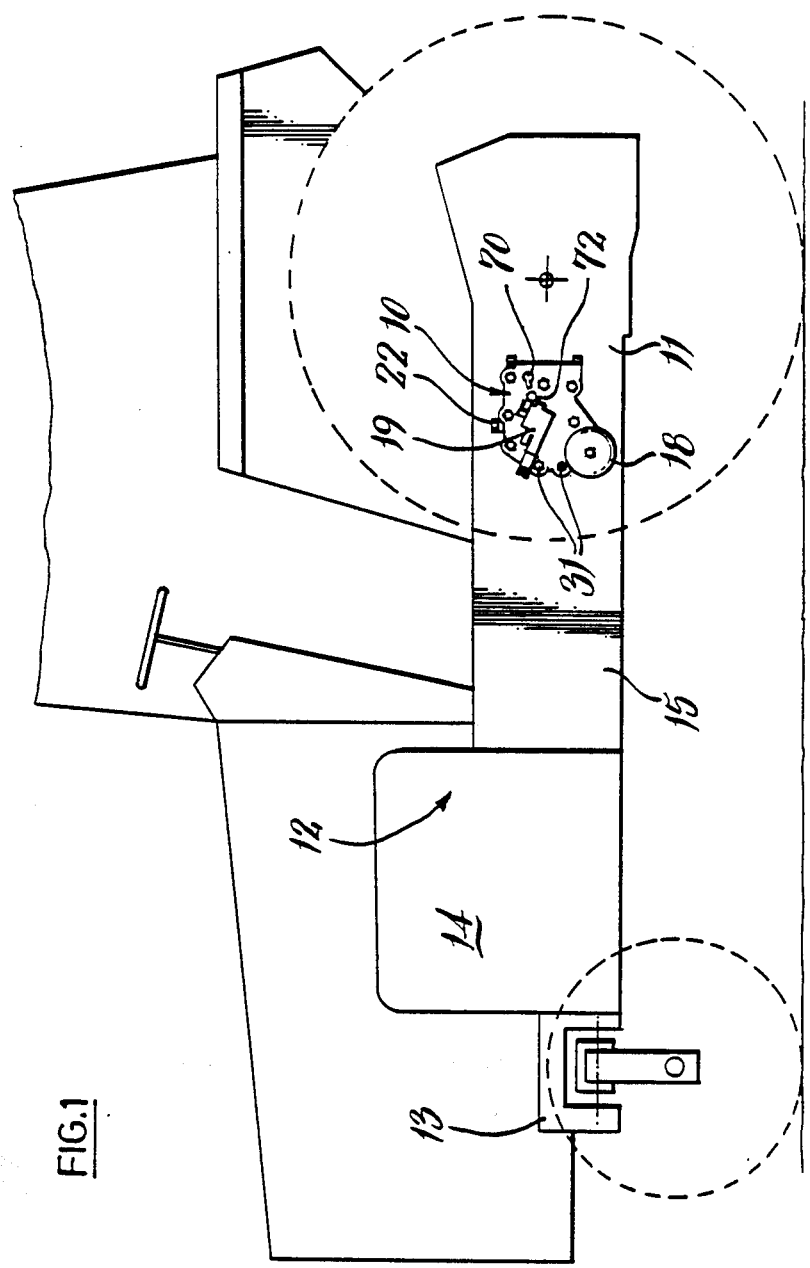
FIG. 1 is a diagrammatic representation of a fluid supply system embodying the present invention mounted on a tractor back axle casing.

Referring to FIG. 1 this diagrammatically shows a hydraulic supply assembly 10 in accordance with the present invention secured in position over an aperture in the side of a back axle casing 11 of an agricultural tractor chassis 12 formed from the usual series arrangement of a front axle support 13, engine block 14, transmission housing 15 and back axle casing 11.

Figure 2:
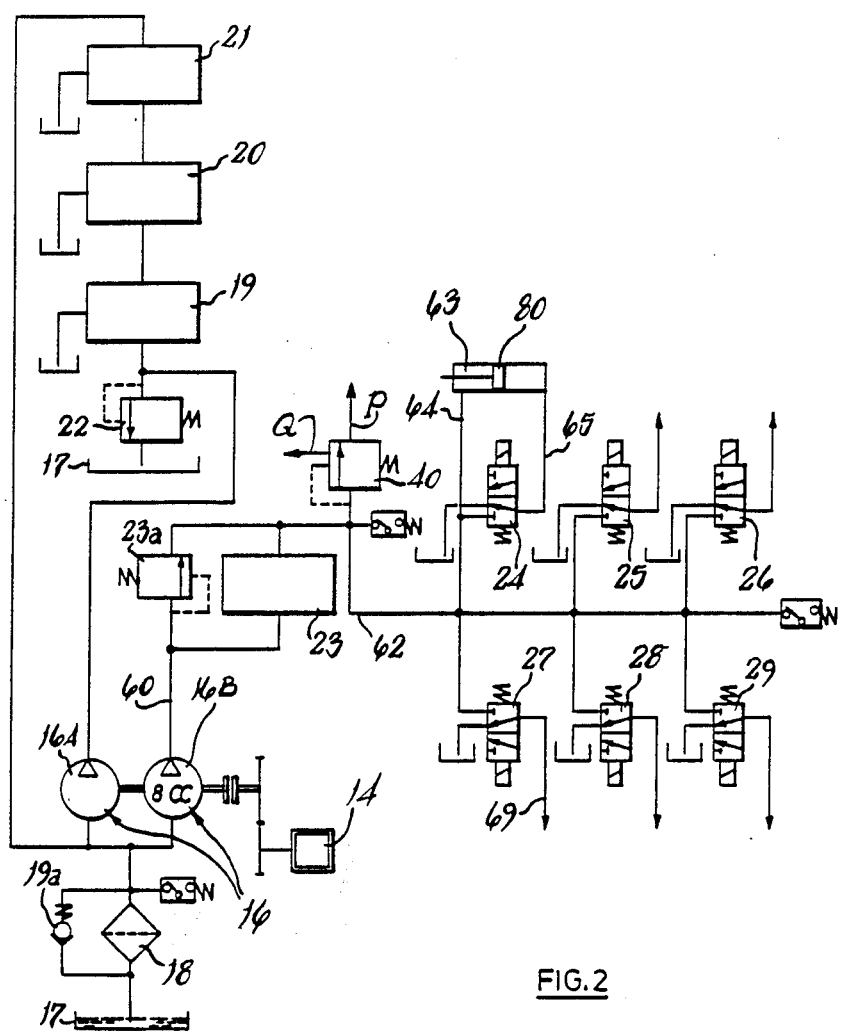
FIG. 2 is a diagram of the hydraulic system of the tractor shown in FIG. 1 of which the supply system of the present invention forms part.

The hydraulic system of the tractor is shown diagrammatically in FIG. 2. Basically the system comprises a dual element pump 16 with a high volume element 16A and a lower volume element 16B both of which draw oil from a reservoir 17 (provided by the interior of the tractor back axle casing 11) via a filter 18 having a conventional blockage bypass valve 18a. The high volume pump element 16A supplies oil at a volume of say 55 litres/min as a priority to an optional trailer braking valve 19, optional auxiliary valves 20 and to a lift valve 21 which controls the high of an implement lift system (not shown). The pressure in the high volume circuit described above is controlled by a pressure relief valve 22 at a level of say 19 MN/m.

The other pump element 16B delivers oil at a lower volume of say 25 litres/min as a priority to the steering circuit 23. The steering circuit is supplied with fluid at a high pressure of say 18 MN/m which is controlled by a pressure relief valve 23a. Oil is also supplied at a lower pressure of say 1.5 MN/m controlled by a pressure relief valve 40 to a bank of solenoid operated fluid flow control valves designated 24 to 29 or other consumers as indicated at P and Q in FIG. 2. Valve 24 controls the high/low range selection in the tactor transmission, valve 25 control the engagement/disengagement of a rear axle differential lock, valve 26 controls the engagement of a power take-off drive clutch, valve 27 controls the engagement/disengagement of an optional front wheel drive clutch, valve 28 controls the operation of a power-shift option available in the transmission, and valve 29 controls the engagement of an optional front power take-off clutch.

Referring to FIGS. 3 to 7 the hydraulic fluid supply assembly comprises a mounting plate 30 which is secured in position over the aperture in the back axle casing 11 by bolts 31. The plate 30 carries the dual element pump 16 on its inner side which is driven via a gear wheel 32 from a gear mounted on the power-take-off shaft. Filter 18 is horizontally disposed and of the bowl or cartridge type and is mounted directly on the outside of the plate 30 by a screw-type filter head mount 41 which is integrally formed in the mounting plate and best seen in section in FIG. 7. The filter draws oil from the bottom of the casing 11 via a suction pipe 33 and supplies filtered oil to the dual element pump 16 via elbow 34 and stand pipe 34a.

Figure 4:
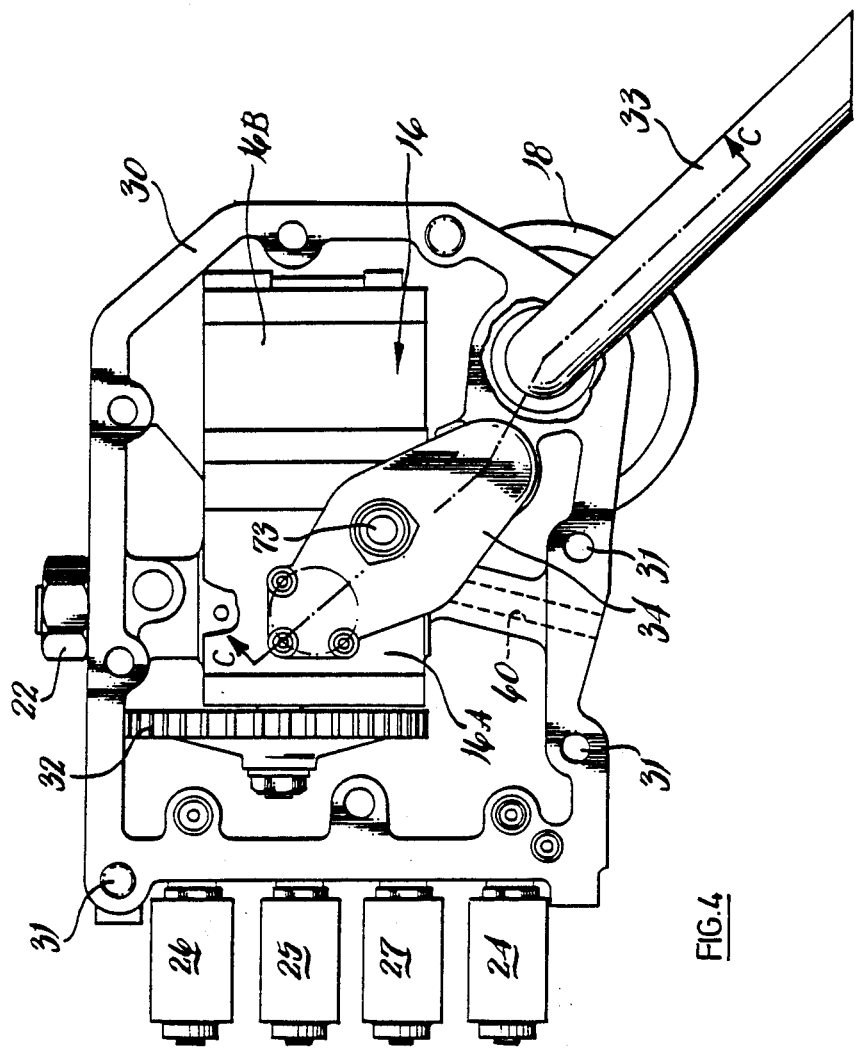
FIG. 4 is a view in the direction of arrow A of FIG. 3.
Figure 5:
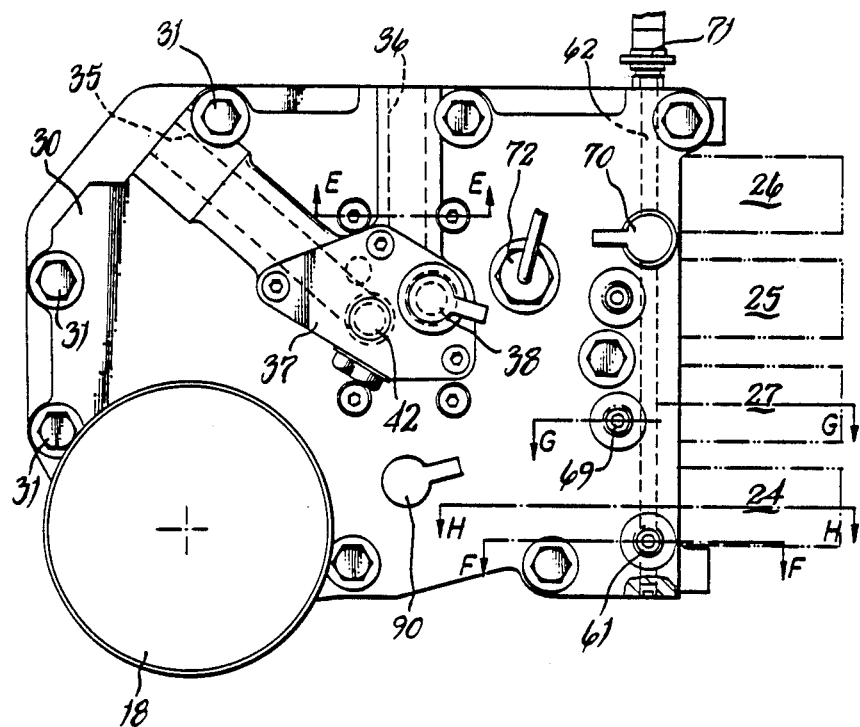
FIG. 5 is a view in the direction of arrow B of FIG. 3.
Figure 6:
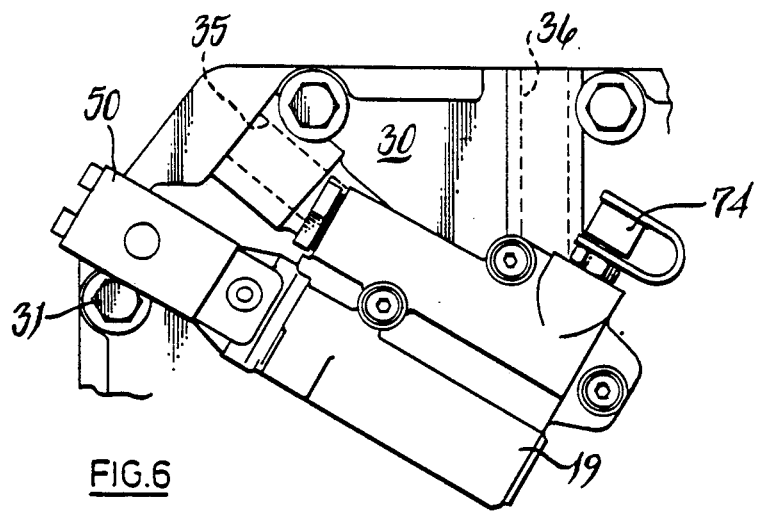
FIG. 6 is a view in the direction of arrow B showing a trailer braking valve option.
Figure 11:
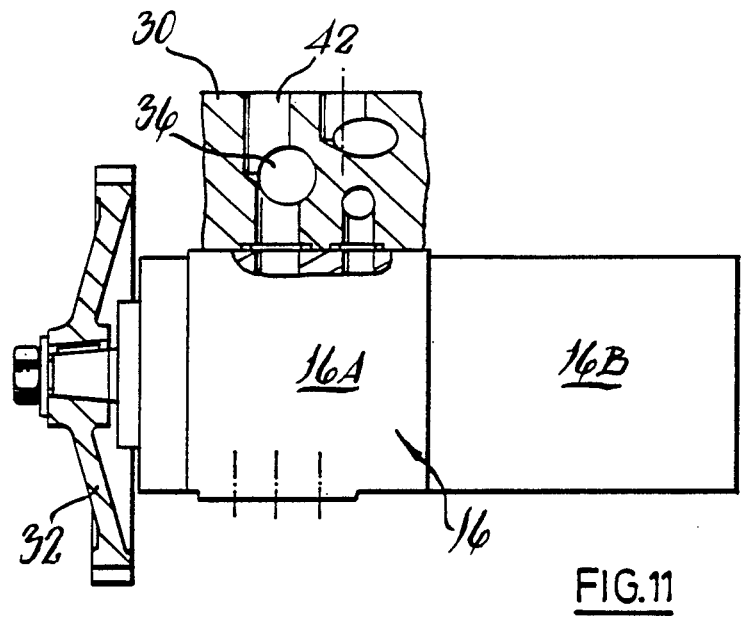
FIG. 11 is a section on line D—D of FIG. 3.
Figure 12:
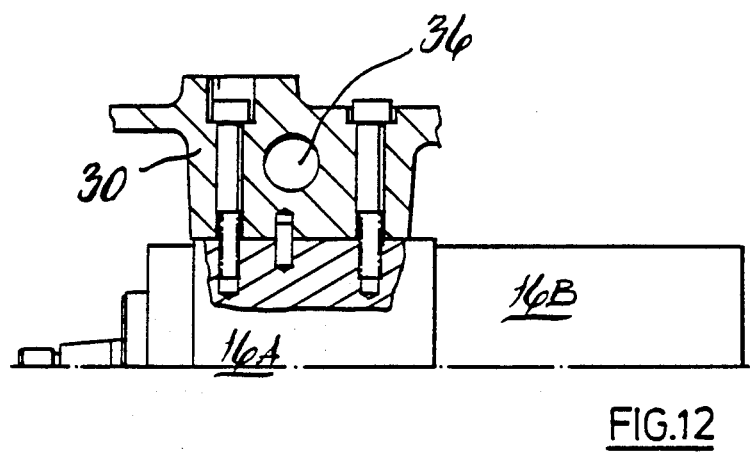
FIG. 12 is a section on line E—E of FIG. 5.

As viewed in FIG. 4, the left-hand high volume element 16A of pump 16 delivers oil via an internal passage 42 (see FIGS. 5 and 11) in the plate 30 to trailer brake valve 19, see FIG. 6, (which is operated by a solenoid 50) and hence via an integral passage 35 in plate 30 to the auxiliary valves 20 of the hydraulic system. Trailer brake valve 19 includes a pressure testing connection 74 of the push-pull type.

Pressure relief valve 22 is housed integrally in a bore 36 in plate 30 which communicates with passage 42 and controls the level of the pressure at the left-hand pump element outlet.

If no trailer brake valve 19 is fitted a block 37 (see FIG. 5) is secured to the outside of the plate 30 to complete the circuit from the pump to the auxiliary passage 35. Block 37 is provided with a pressure testing connection 38.

It will be appreciated from FIG. 2 that the supply of fluid to the lift valve 21 is from the auxiliary valves 20 and is not therefore mounted on plate 30.

The return from the lift valve 21 is fed to pump element 16A via return pipe 73 which enters elbow 34 and thus bypasses the pump suction pipe 33 and filter 18.

Figure 3:
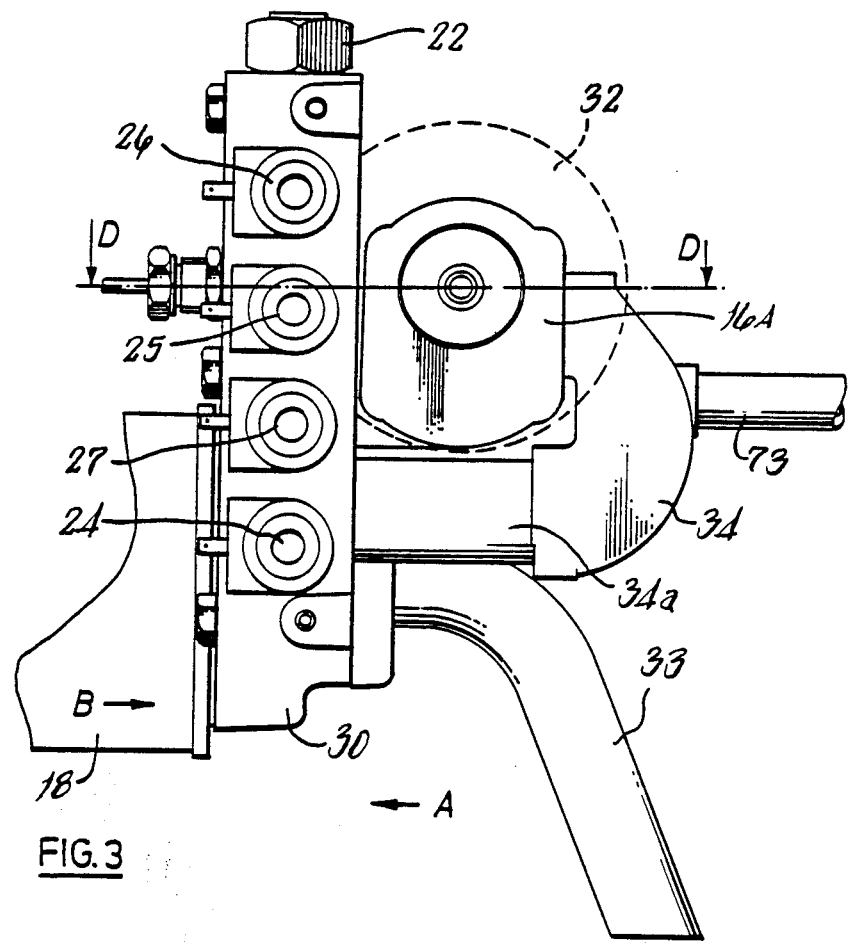
FIG. 3 is an end view of the supply system of FIG. 1 on a larger scale.
Figure 8:
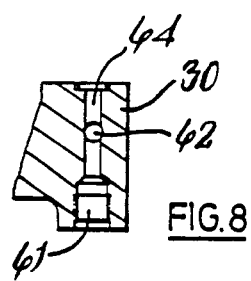
FIG. 8 is a section on line F—F of FIG. 5.
Figure 9:
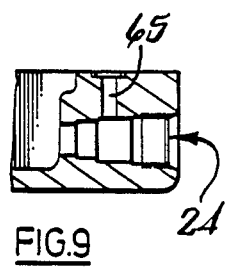
FIG. 9 is a section on line H—H of FIG. 5.

The Other pump element 16B delivers oil directly to steering circuit 23 via a passage 60 (with a testing connection 90) formed in plate 30. The return from the steering circuit re-enters the plate 30 at inlet 61 (see FIGS. 5 and 8). Inlet 61 communicates with a gallery 62 which extends vertically adjacent one end of plate 30 and provides a pressure feed for each of the solenoid operated control valves mounted on the plate. In FIGS. 3,4 and 5 valves 24, 25, 26 and 27 are shown receiving their feed from gallery 62.

Valve 24 controls a hydraulic ram 63 (see FIG. 2) whose rod end is permanently connected to pressurised fluid via passage 64 to hold the piston 80 of ram 63 at its extreme right-hand position. The other end of cylinder 63 can be pressurised by the operation of valve 24 which connects outlet 65 with the fluid pressure in gallery 62 to move the ram piston 80 to its extreme left hand position (due to the differential area of the piston) thus changing the high/low range selection in the tractor transmission.

Figure 10:
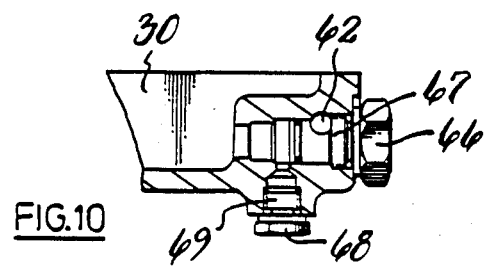
FIG. 10 is a section on line G—G of FIG. 5 showing the plugging arrangement used when no front wheel drive clutch is employed.
Figure 7:
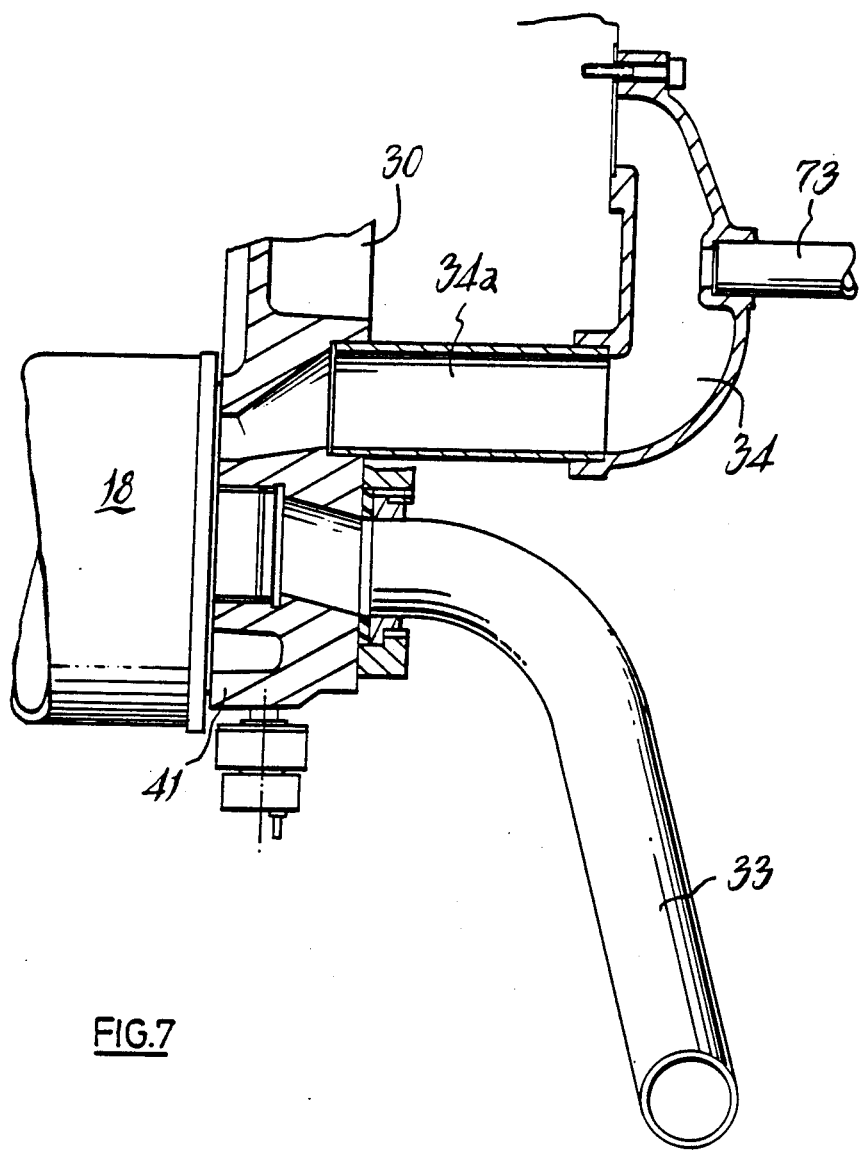
FIG. 7 is section on line C—C of FIG. 4.

FIG. 10 shows the plugging arrangement which is employed if valve 27 is not fitted (i.e., when the tractor is rear wheel drive only). A plug 66 plugs the outlet 67 normally connected to valve 27 and a plug 68 plugs the outlet 69 which is normally connected to the front wheel drive clutch.

Gallery 62 also includes a pressure testing connection 70 and a pressure switch 71 which closes the end of gallery 62 and provides an indication of the failure of pressure in gallery 62.

The plate 30 also carries an electrical power-take-off speed sensor 72 which provides an electrial signal indicative of the rotational speed of the power take-off shaft which is used in a power take-off control system not forming part of the present invention.

It will be appreciated from the above that the present invention provides a significantly improved form of hydraulic fluid supply assembly which overcomes many of the problems associated with conventional supply assemblies. In particular it will be noted that the entire assembly can be removed from the tractor as one unit simply by removing screws 31 and detaching any associated piping. Also many of the elements of the supply assembly are interconnected by passages formed integrally in the mounting plate thus minimising the possibility of leakage and failure. A further important feature of the invention is the provision of the filter head integrally in the mounting plate which simplies the assembly still further and provides a useful cost saving.

I claim:

1. An hydraulic fluid supply assembly for an agricultural or industrial tractor or similar vehicle, the assembly comprising:
   a mounting plate for closing an aperture in a casing of the vehicle which acts as a reservoir for hydraulic fluid,
   an hydraulic pump carried on one side of the plate,
   a pump feed means carried by the plate and connected with the pump,
   a filter mount carried on the other side of the plate and hydraulically connected with the pump and the pump feed means,
   a filter carried by the mount, the filter being removable from the mount with the plate secured in position closing the aperture,
   one or more hydraulic valves or other hydraulic consumers carried by the plate, and
   supply passages formed internally in the mounting plate to connect one or more the consumers with the pump,
   the assembly being demountable from the casing as a unit.

2. A supply assembly according to claim 1 in which the mounting plate carries more than one pump, the pumps using the same pump feed means and filter and supplying different hydraulic consumers.

3. A supply assembly according to claim 1 in which the mounting plate carries a gear wheel or other pump drive means which engages with the vehicle drive train to provide drive to the pump or pumps when the mounting plate is secured in position over the casing aperture.

4. A supply assembly according to claim 1 in which the mounting plate includes an hydraulic connection for the return of fluid from one or more hydraulic consumers to the pump or pumps without passage through the pump feed means and filter.

5. A supply according to claim 1 in which the mounting plate includes one or more hydraulic test points which communicate with internal passages within the plate so that the hydraulic pressure at various locations in hydraulic circuits associated with the assembly can be checked.

6. A supply assembly according to claim 1 in which the filter mount is formed integrally in the mounting plate.

7. An agricultural or industrial tractor in which an hydraulic fluid supply assembly according to claim 1 closes an aperture in a transmission casing or back axle casing of the tractor and the pump takes its supply of fluid from the fluid within the transmission or back axle.

* * * * *